United States Patent
Lee et al.

(10) Patent No.: US 11,426,991 B2
(45) Date of Patent: Aug. 30, 2022

(54) METHOD FOR MANUFACTURING PLASTIC GLAZING

(71) Applicant: SEOYON E-HWA CO., LTD., Seoul (KR)

(72) Inventors: Si Wook Lee, Seoul (KR); Ho Jung Kim, Anyang (KR)

( * ) Notice: Subject to any disclaimer, the term of this patent is extended or adjusted under 35 U.S.C. 154(b) by 0 days.

(21) Appl. No.: 17/389,459

(22) Filed: Jul. 30, 2021

(65) Prior Publication Data
US 2022/0032597 A1 Feb. 3, 2022

(30) Foreign Application Priority Data

Jul. 30, 2020 (KR) .......................... 10-2020-0095121

(51) Int. Cl.
 *B32B 37/12* (2006.01)
 *B29C 51/00* (2006.01)
 (Continued)

(52) U.S. Cl.
 CPC ............ *B32B 37/12* (2013.01); *B29C 51/002* (2013.01); *B29C 51/14* (2013.01); *B32B 7/12* (2013.01);
 (Continued)

(58) Field of Classification Search
 CPC ........... B32B 37/12; B32B 7/12; B32B 27/08; B32B 27/308; B32B 27/365; B32B 38/145; B32B 2037/1253; B32B 2255/10; B29C 51/002; B29C 51/14; B29K 2033/12; B29K 2069/00
 See application file for complete search history.

(56) References Cited

U.S. PATENT DOCUMENTS

| 3,451,374 A | * | 6/1969 | Clausen | ................ B05C 5/0254 |
| | | | | 118/694 |
| 2006/0225831 A1 | * | 10/2006 | Lei | .......................... B32B 38/10 |
| | | | | 156/229 |

(Continued)

FOREIGN PATENT DOCUMENTS

| DE | 4413266 A1 | 10/1995 |
| JP | 2013080219 A | * 5/2013 |

OTHER PUBLICATIONS

JP2013080219A Machine Translation of Description (EPO/Google) (Year: 2022).*
DE OA dated Jan. 24, 2022.

*Primary Examiner* — Cynthia L Schaller
(74) *Attorney, Agent, or Firm* — Harvest IP Law, LLP

(57) ABSTRACT

The present disclosure relates to a method for manufacturing highly reliable plastic glazing by forming a high hardness coating layer. The method for manufacturing plastic glazing includes: a base material layer supply step of supplying base material layer made of polycarbonate (PC) resin; an adhesive supply step of applying an adhesive to at least one side of the base material layer; a coating film supply step of seating a coating film on an upper side of the adhesive applied to the base material layer; and an attaching step of pressing the supplied coating film and of attaching to the base material layer. Through such a manufacturing method, there is an effect of improving the scratch resistance, abrasion resistance, chemical resistance, and light resistance by forming the high hardness coating layer in the base material layer made of PC.

18 Claims, 14 Drawing Sheets

(51) Int. Cl.

| | |
|---|---|
| *B29C 51/14* | (2006.01) |
| *B32B 7/12* | (2006.01) |
| *B32B 27/08* | (2006.01) |
| *B32B 27/30* | (2006.01) |
| *B32B 27/36* | (2006.01) |
| *B32B 38/00* | (2006.01) |
| *B29K 33/00* | (2006.01) |
| *B29K 69/00* | (2006.01) |

(52) U.S. Cl.
CPC ............ *B32B 27/08* (2013.01); *B32B 27/308* (2013.01); *B32B 27/365* (2013.01); *B32B 38/145* (2013.01); *B29K 2033/12* (2013.01); *B29K 2069/00* (2013.01); *B32B 2037/1253* (2013.01); *B32B 2255/10* (2013.01)

(56) References Cited

U.S. PATENT DOCUMENTS

| | | | | |
|---|---|---|---|---|
| 2007/0181456 | A1* | 8/2007 | Kusuda | G06F 1/1643 |
| | | | | 206/443 |
| 2013/0004700 | A1* | 1/2013 | Jo | B32B 3/14 |
| | | | | 428/77 |
| 2013/0177748 | A1* | 7/2013 | Hirai | B32B 27/283 |
| | | | | 428/203 |
| 2013/0209796 | A1* | 8/2013 | Yamada | B32B 27/36 |
| | | | | 428/339 |
| 2016/0311182 | A1* | 10/2016 | Sherman | B32B 7/12 |
| 2018/0282485 | A1* | 10/2018 | Kuwana | B32B 9/005 |

\* cited by examiner

[FIG. 1]
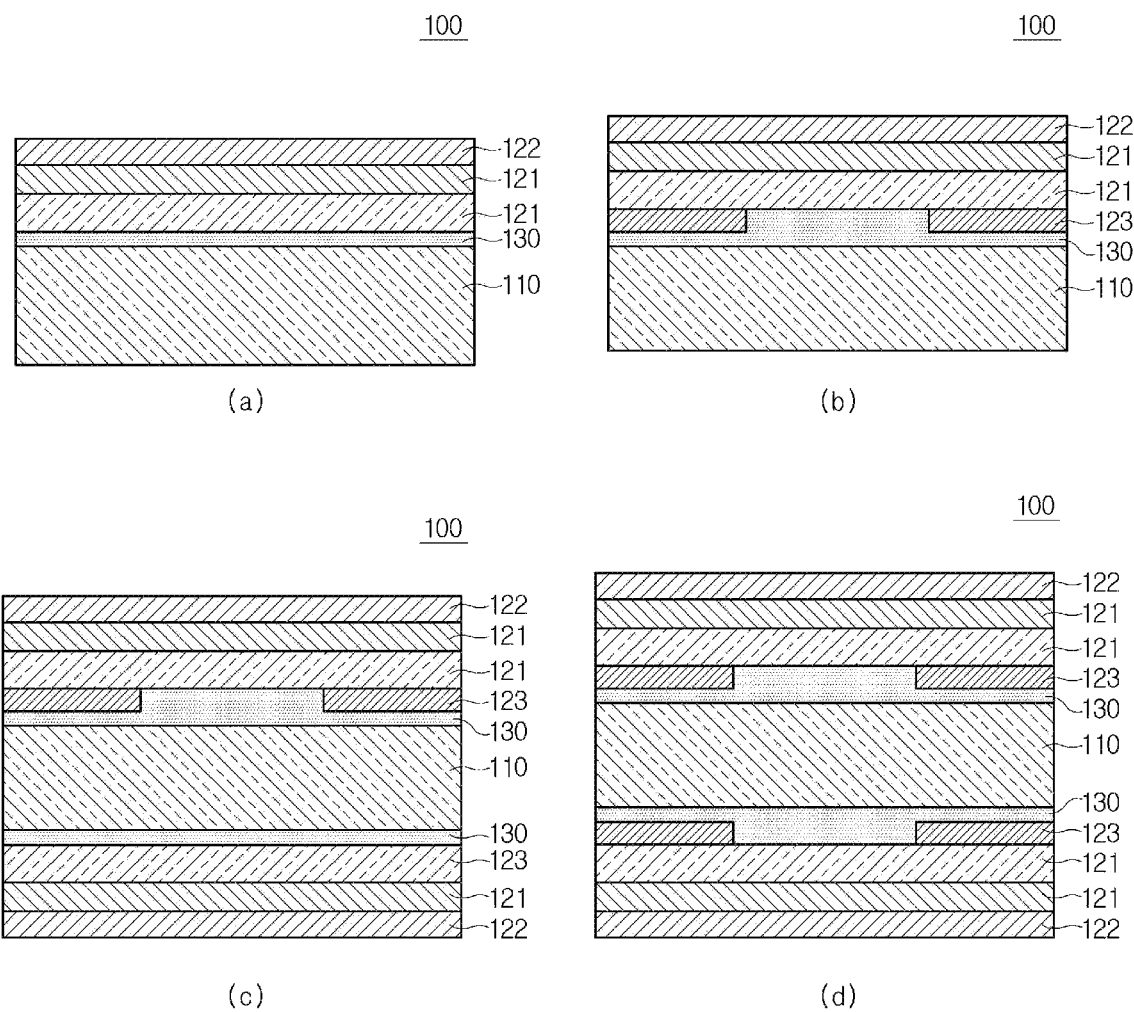

[FIG. 2]
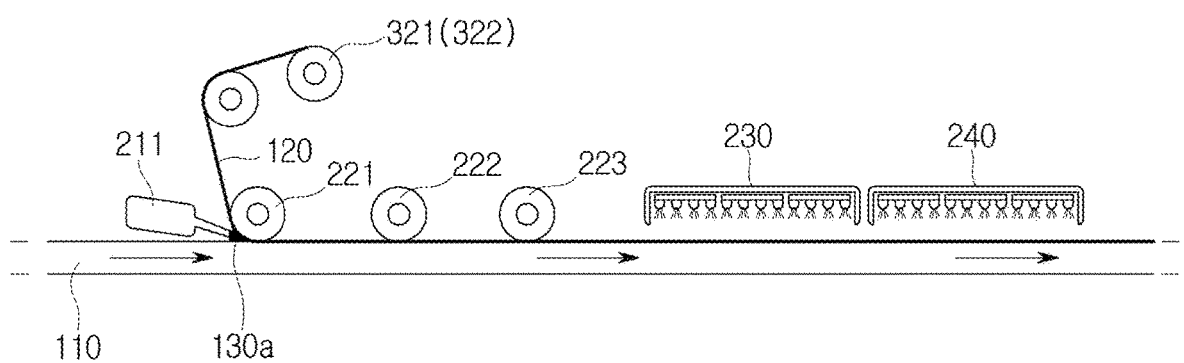

[FIG. 3]
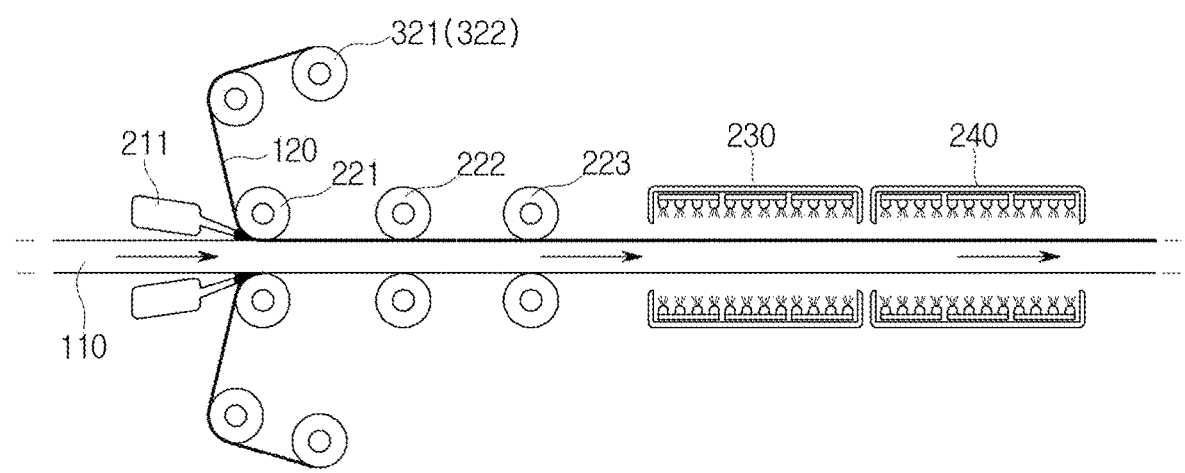

[FIG. 4]
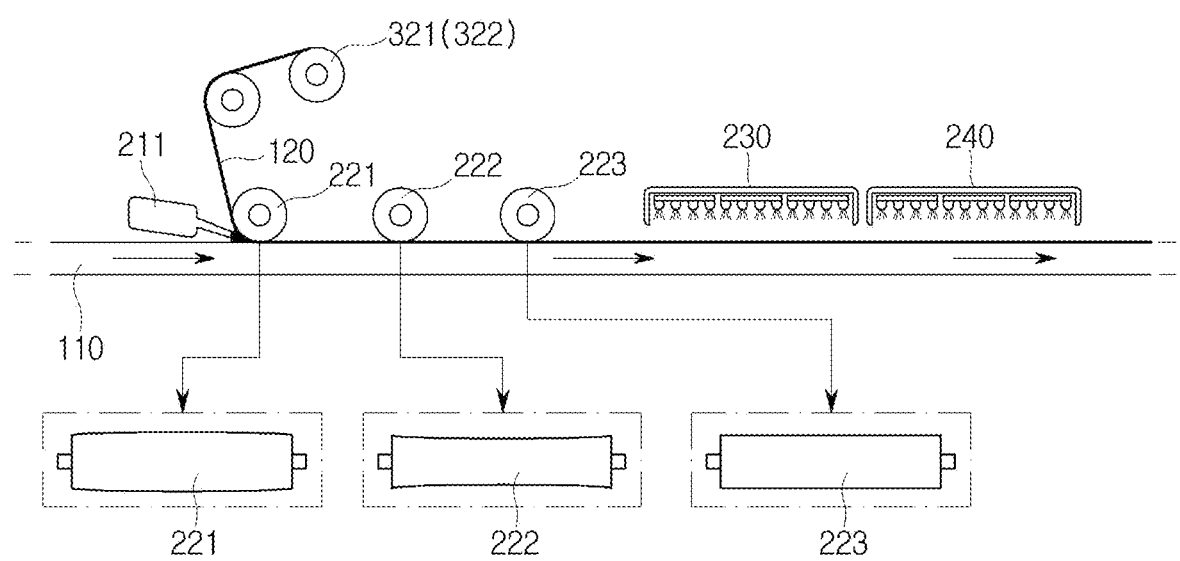

[FIG. 5]
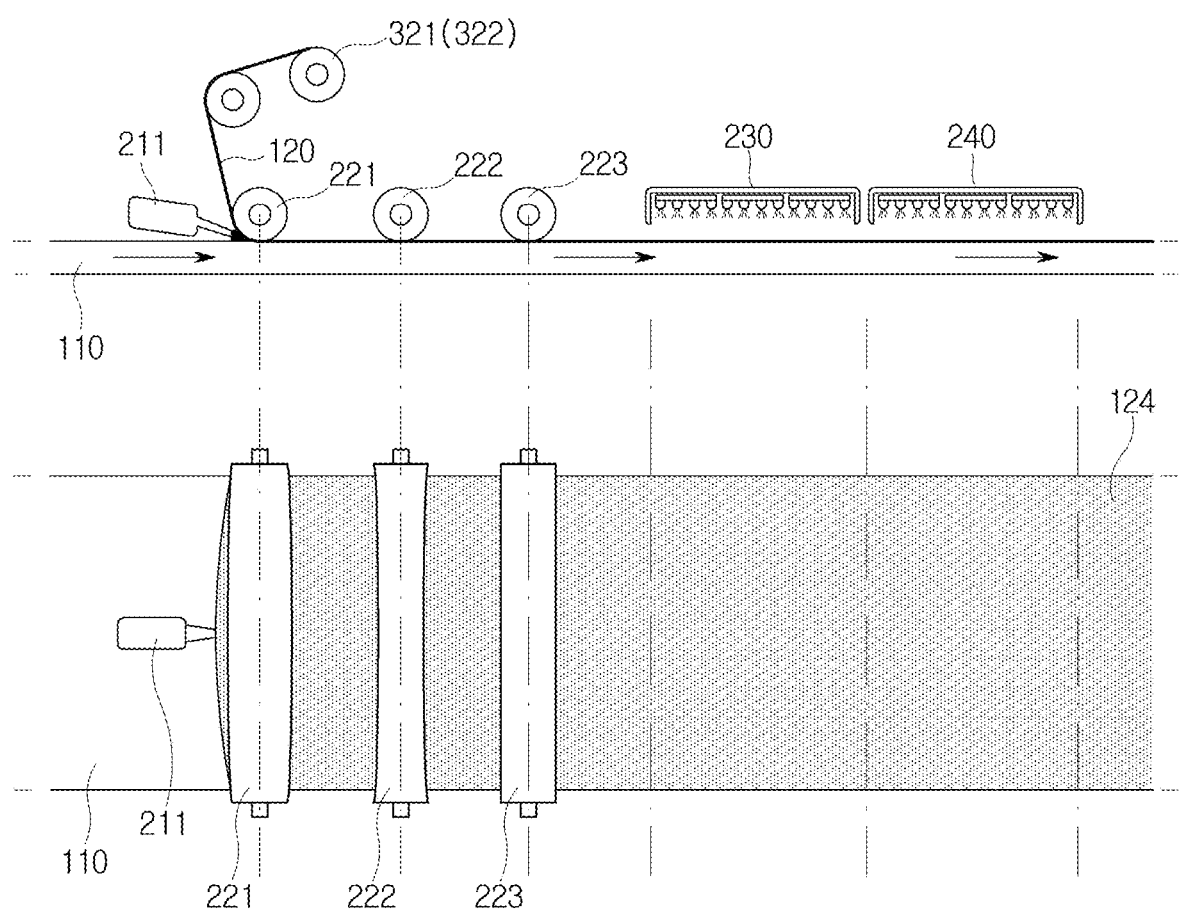

[FIG. 6]
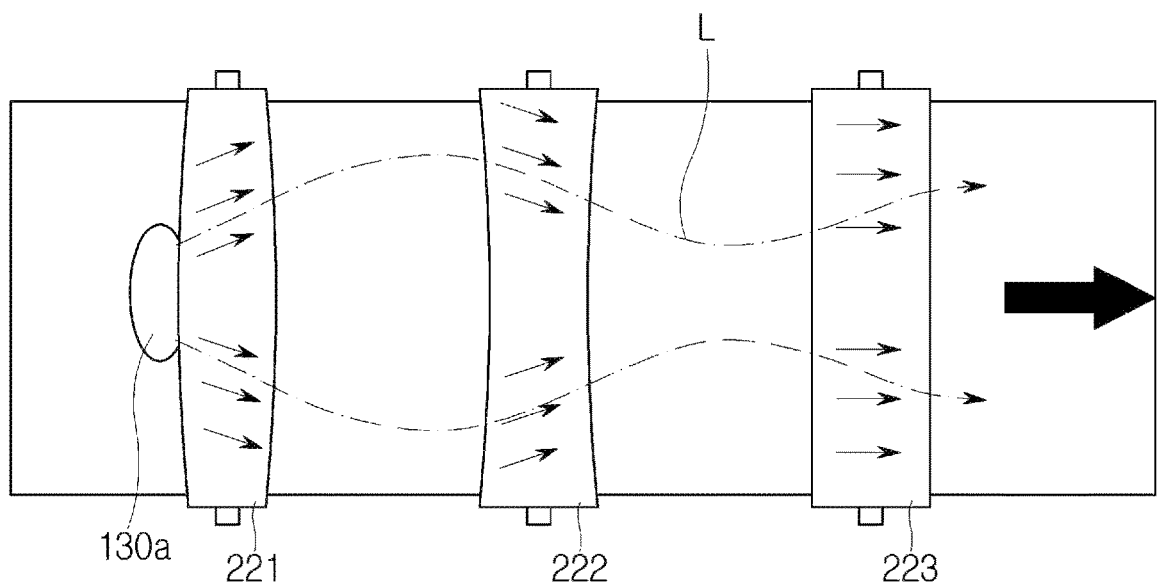

[FIG. 7]
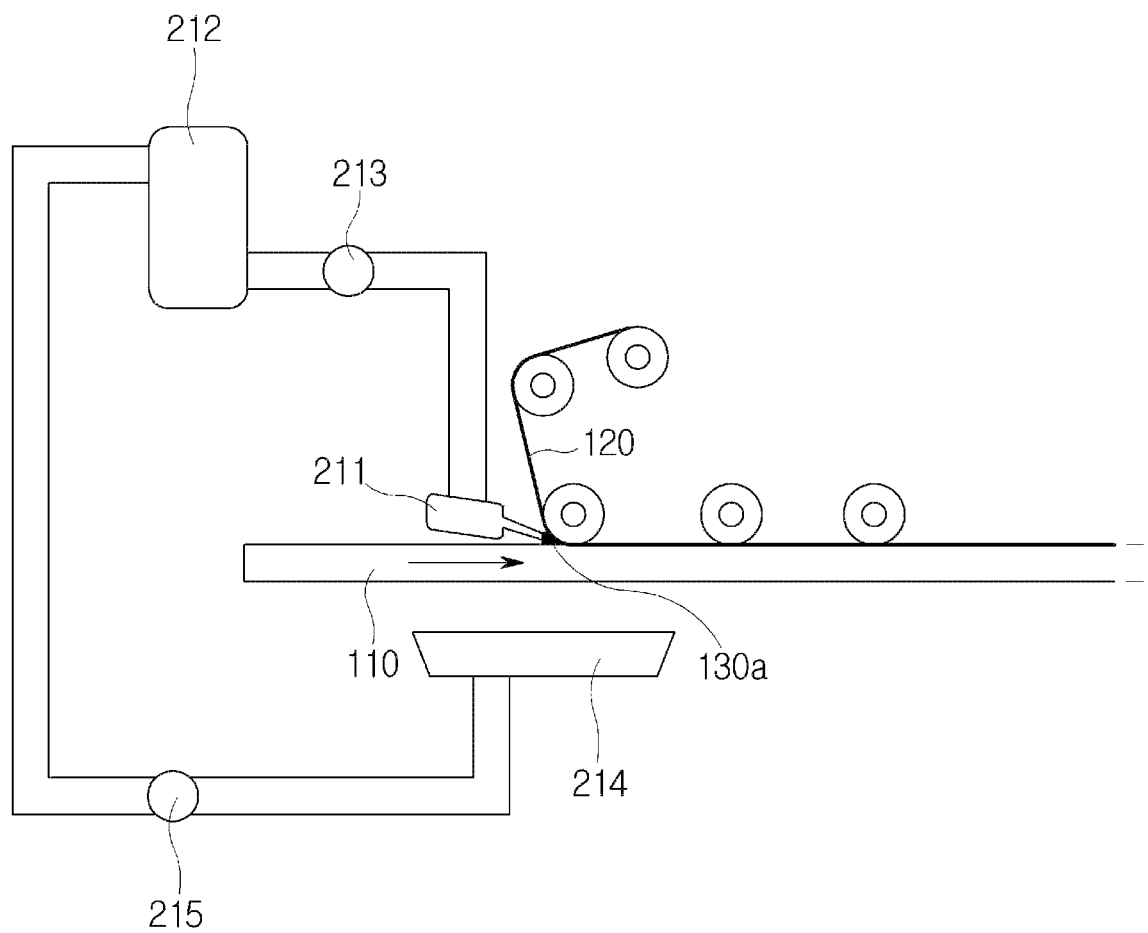

[FIG. 8]
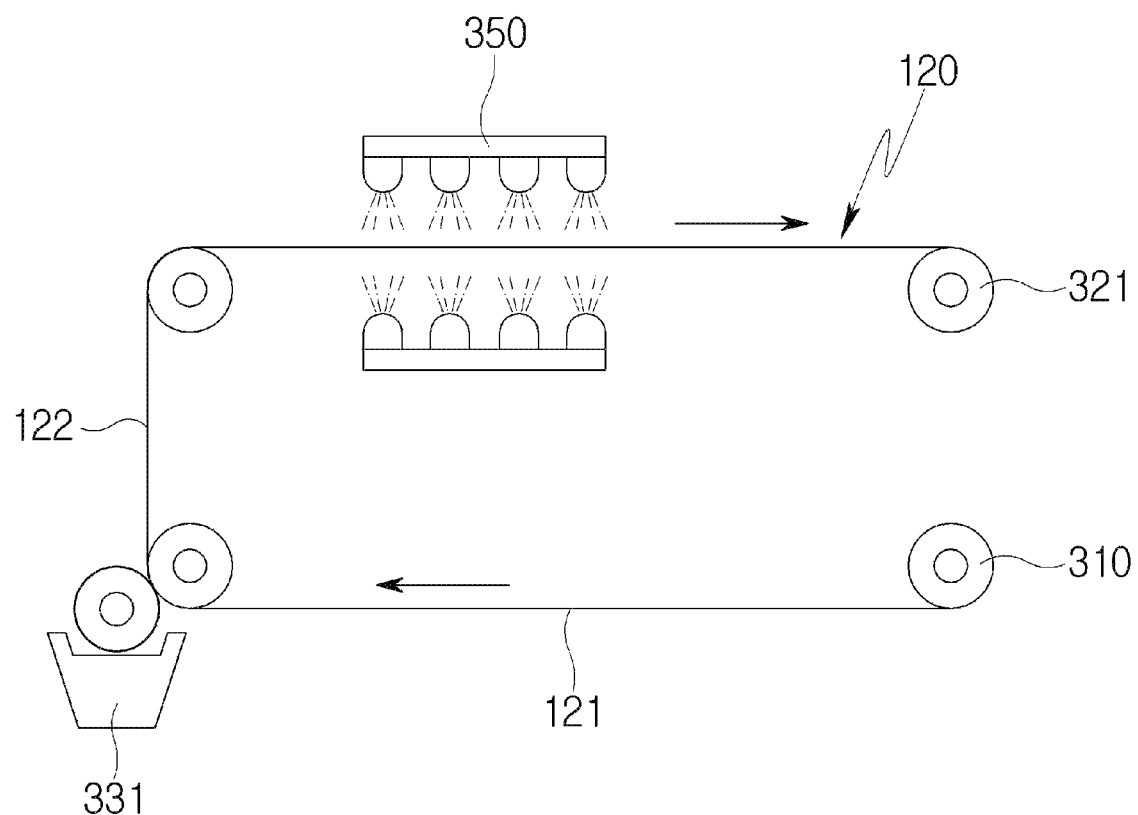

[FIG. 9]
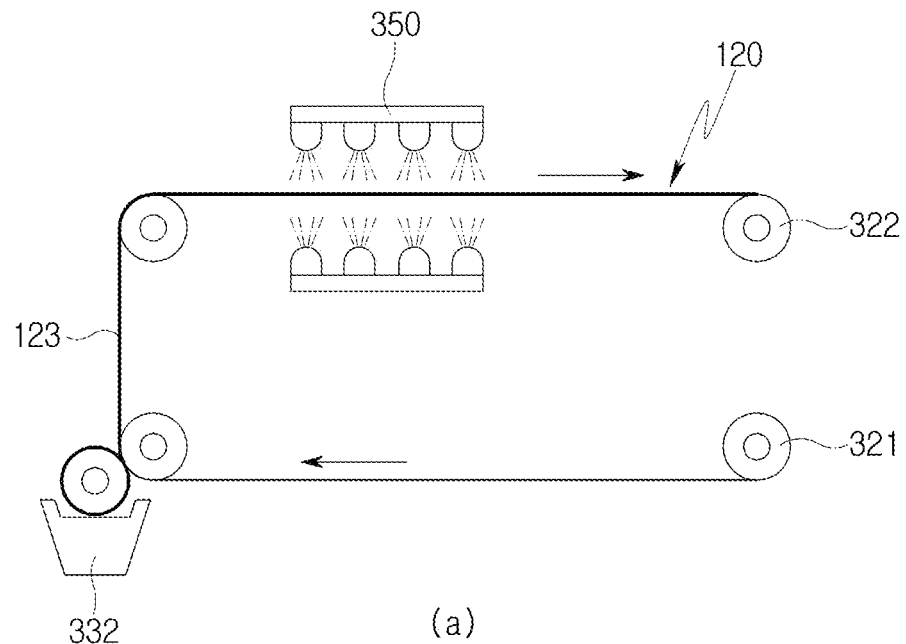
(a)
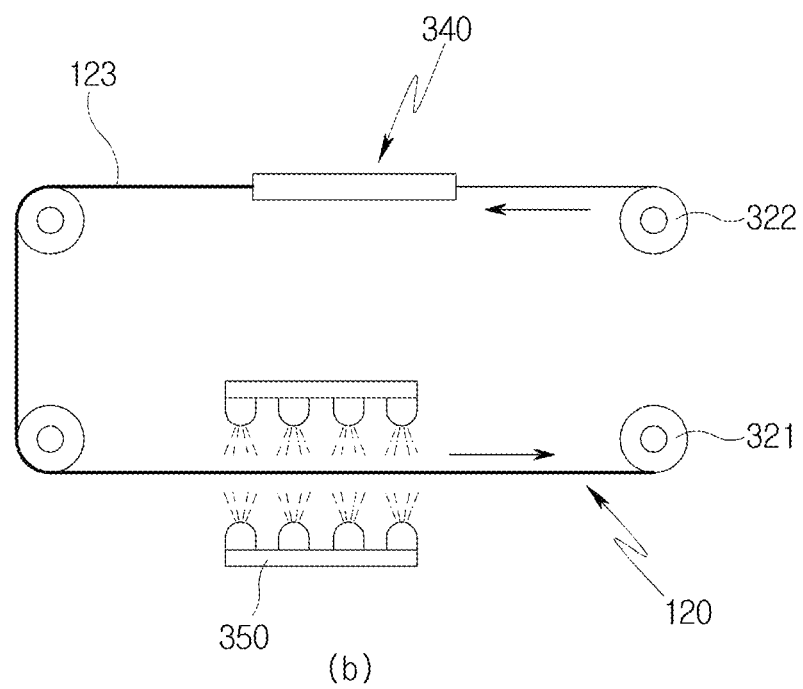
(b)

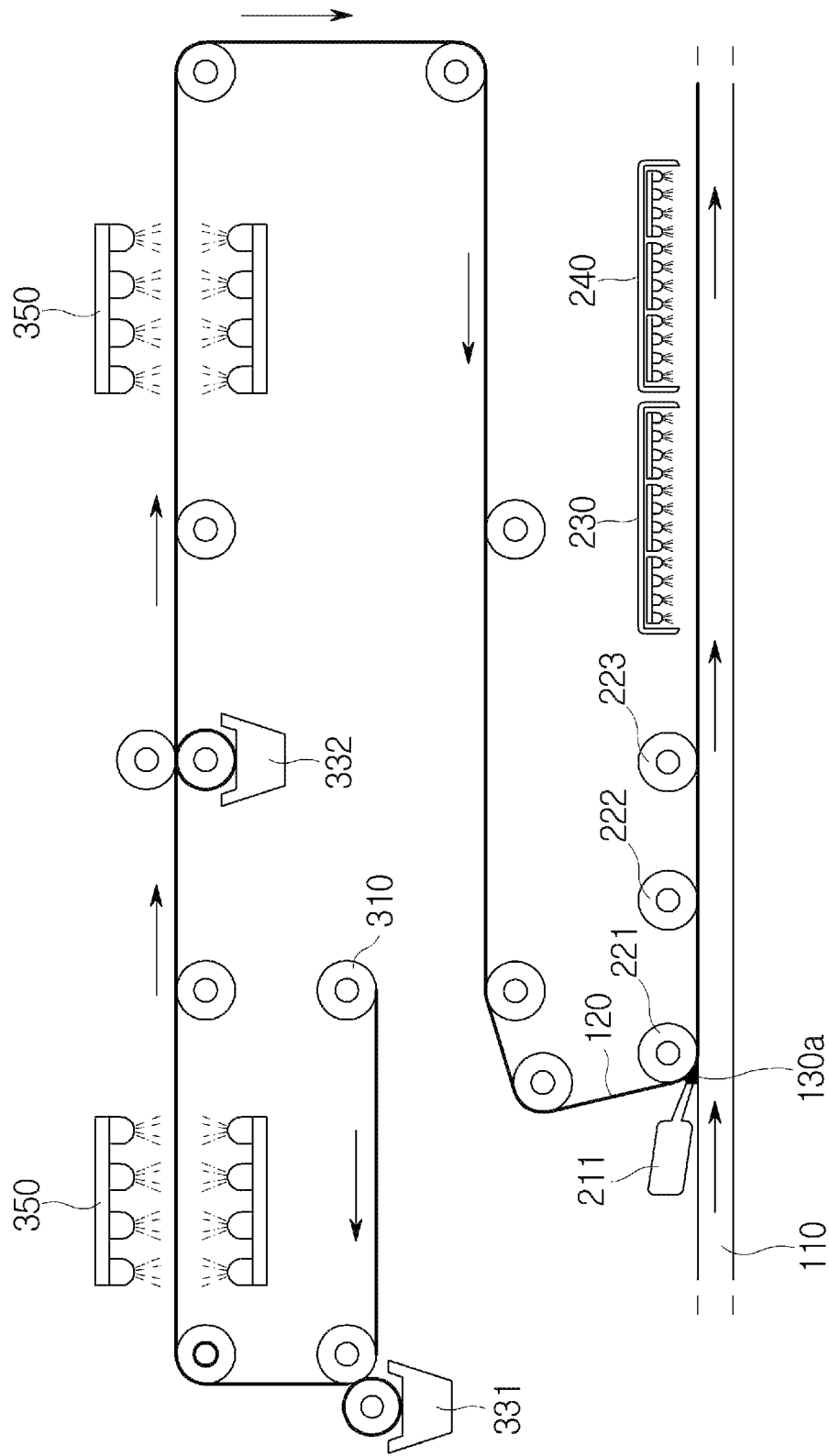
[FIG. 10]

[FIG. 11]
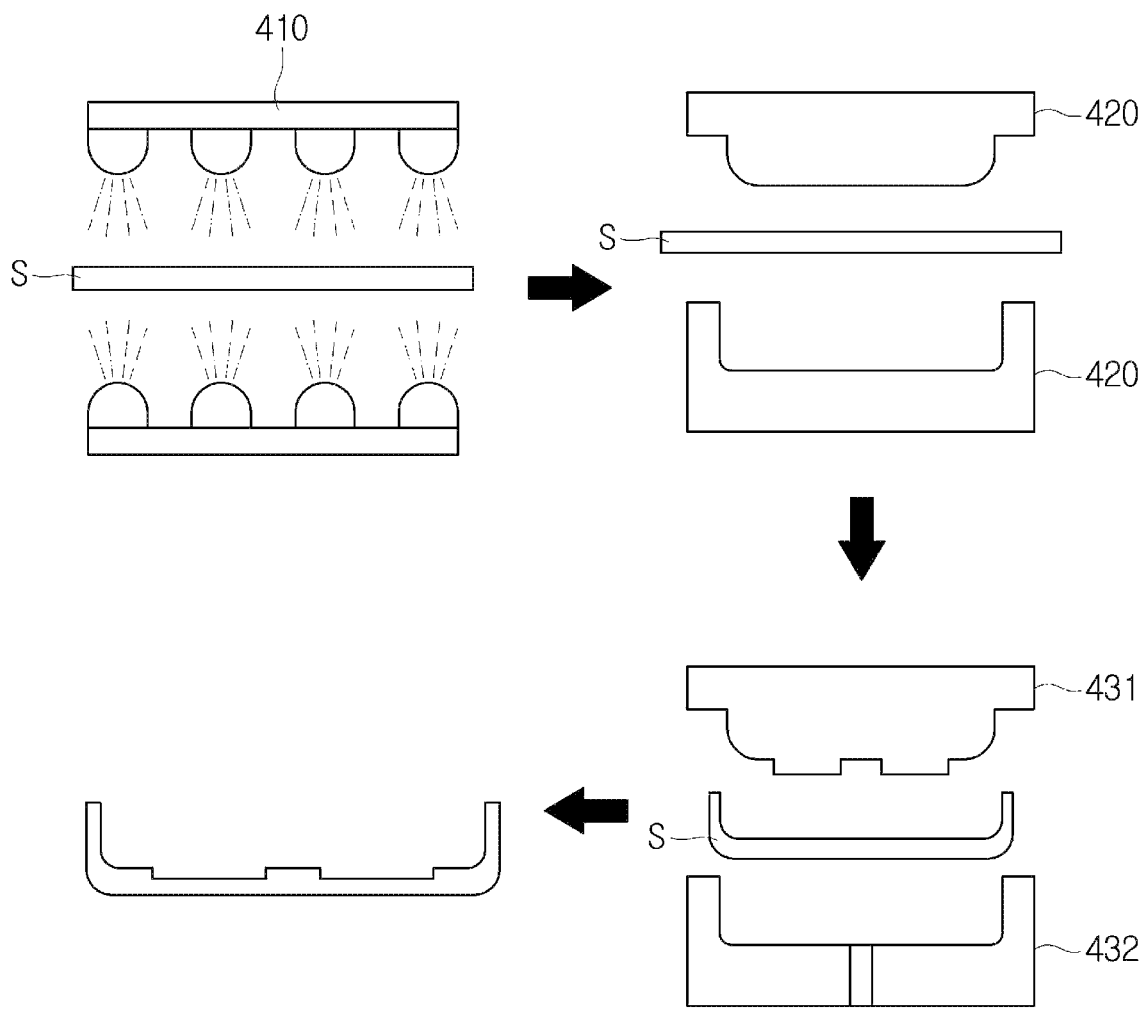

[FIG. 12]
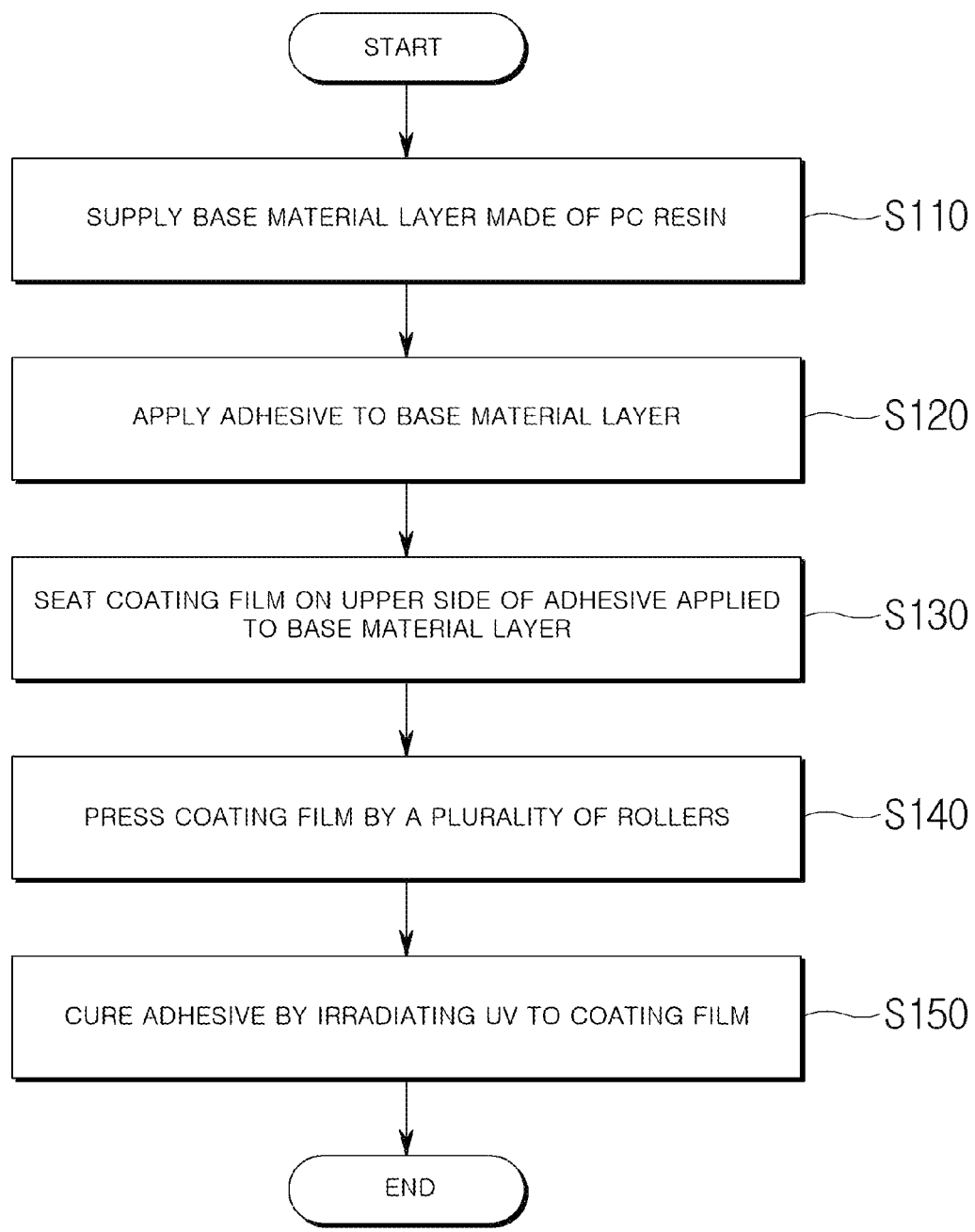

[FIG. 13]
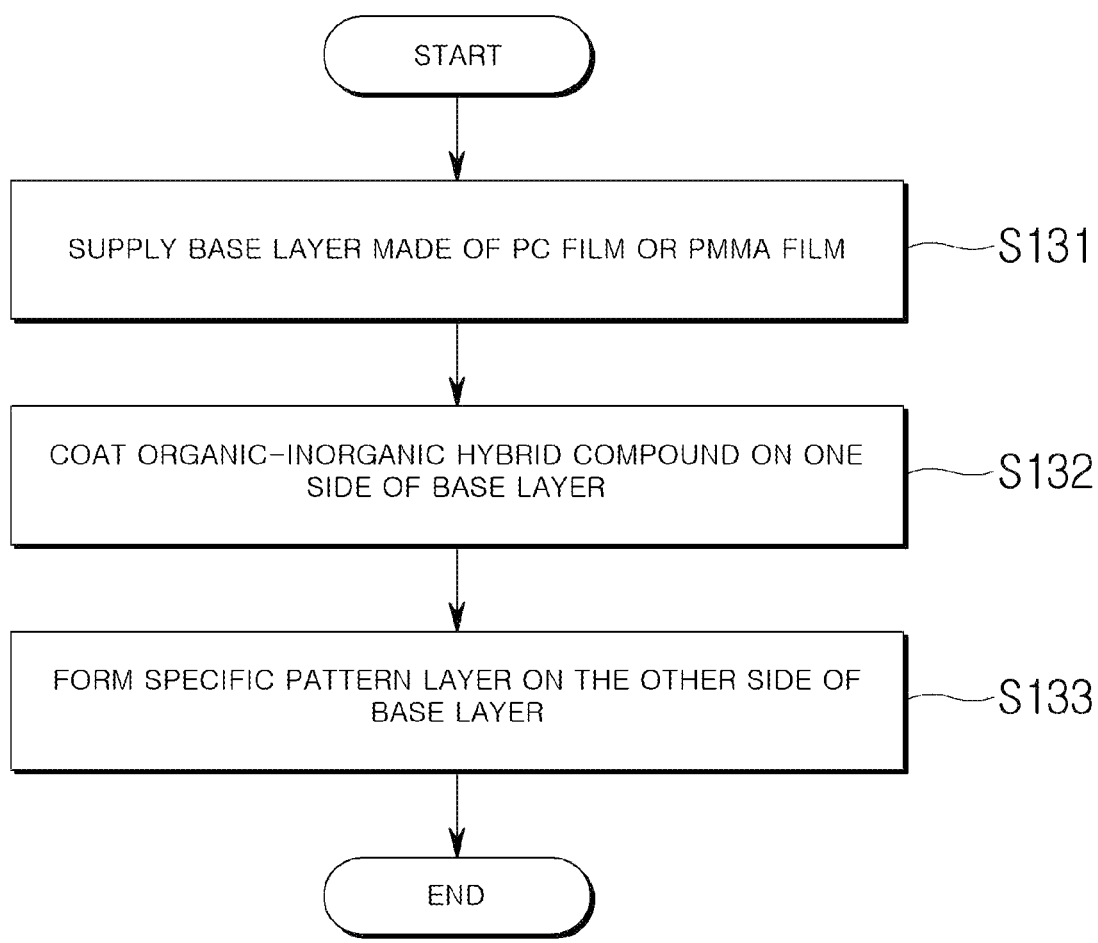

[FIG. 14]
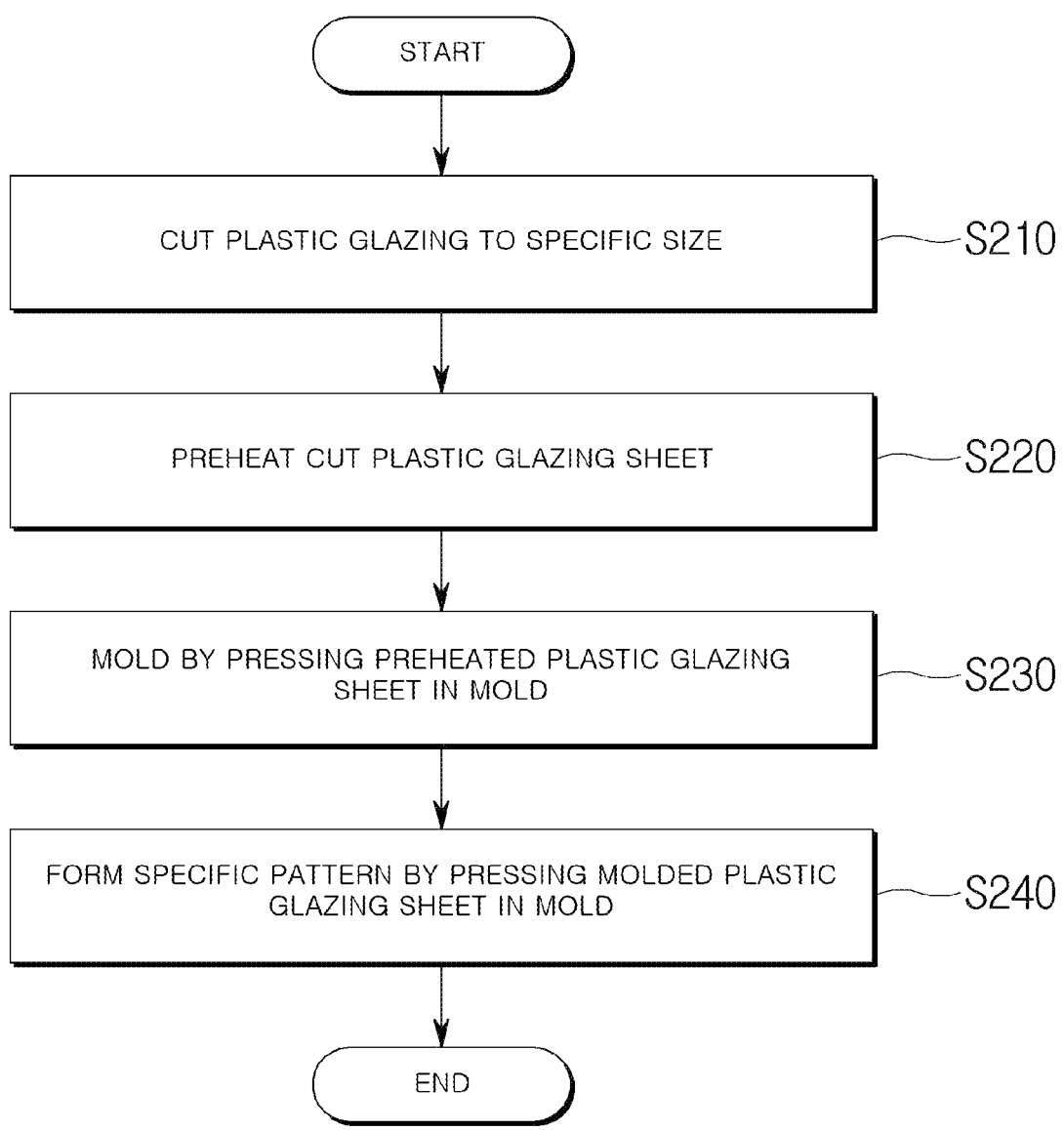

METHOD FOR MANUFACTURING PLASTIC GLAZING

CROSS-REFERENCE TO RELATED APPLICATIONS

This application claims priority to Korean Patent Application No. 10-2020-0095121, filed on Jul. 30, 2020, the disclosure of which is incorporated herein by reference in its entirety.

BACKGROUND

Field

The present disclosure relates to a method for manufacturing plastic glazing and more particularly to a method for manufacturing highly reliable plastic glazing by forming a high hardness coating layer.

Description of the Related Art

Polycarbonate (PC) is a representative thermoplastic material with a heat deformation temperature of 135° C. or higher. The polycarbonate has excellent physical property balance such as transparency, impact resistance, self-extinguishability, dimensional stability and thermal resistance, so that the polycarbonate is widely used for variety of purposes including electric and electronic products, office machine, automobile parts, etc.

The polycarbonate is much used as a glazing material by using excellent impact resistance, transparency, and moldability of the polycarbonate. In particular, review for applying the polycarbonate as a substitute for metal and glass in the construction and automobile industries are being actively performed. The polycarbonate provides new uses to the construction and automobile industries by using excellent impact strength, optical transmittance, and moldability to which various designs can be applied.

In particular, in the construction industry, when plastic glazing using polycarbonate is substituted for a glass product, the plastic glazing is not easily damaged and is easy to manufacture due to its lightweight, and safety accidents caused by damage can be prevented.

Further, in the automobile industry, when plastic glazing using polycarbonate is substituted for glass products in a vehicle, the center of gravity of the vehicle is lowered, thereby enabling safer driving. Moreover, since the weight reduction of the vehicle improves the fuel efficiency, economic advantages can be sufficiently obtained.

However, polycarbonate, which is considered as an alternative material for glass, is easily scratched.

Therefore, in order to substitute polycarbonate for glass products, efforts to improve scratch resistance, abrasion resistance, chemical resistance, and light resistance are required.

PRIOR ART DOCUMENT

Patent Document (Patent Document 1) Korean Patent No. 1727906 (Apr. 12, 2017)

SUMMARY

Technical Problem

The purpose of the present invention is to solve the above-mentioned problems and is to provide a method for manufacturing plastic glazing having excellent reliability.

Technical Solution

One embodiment is a method for manufacturing plastic glazing. The method includes: a base material layer supply step of supplying base material layer made of polycarbonate (PC) resin; an adhesive supply step of applying an adhesive to at least one side of the base material layer; a coating film supply step of seating a coating film on an upper side of the adhesive applied to the base material layer; and an attaching step of pressing the supplied coating film and of attaching to the base material layer.

Here, in the adhesive supply step, a certain amount of the adhesive may be supplied through a discharge pump from a storage tank in which the adhesive is stored to a discharge device which applies the adhesive on a surface of the base material layer.

Furthermore, the method may further include an adhesive recovery step of recovering the adhesive to the storage tank through a recovery pump from a recovery tray which stores the adhesive flowing down from the base material layer.

The attaching step may include: a pressing step of pressing the coating film by a plurality of rollers; and a curing step of curing the adhesive by irradiating UV to the coating film.

More specifically, the pressing step may include: a first moving step of moving the applied adhesive in a first direction by pressing it with a first roller and of removing contained bubbles; a second moving step of controlling a thickness of the adhesive by moving the adhesive that has been moved in the first direction in a second direction by pressing the adhesive with a second roller; and a flattening step of flattening the adhesive by pressing the adhesive with a third roller.

Also, in the first moving step, the first roller may be provided to have a convex shape that increases in diameter toward the center thereof, and may move the applied adhesive outward.

Also, in the first moving step, the first roller may be used by changing a deviation of an outer diameter of the first roller with respect to a center diameter of the first roller in response to a thickness of an adhesive layer.

Furthermore, in the first moving step, when the thickness of the adhesive layer is 50 to 100 µm, the first roller of which the outer diameter of the first roller is formed 4 to 10 mm smaller than the center diameter of the first roller may be used.

In the second moving step, the second roller may be provided to have a concave shape that decreases in diameter toward the center thereof, and may move inward the adhesive that has been moved outward.

In the second moving step, the second roller of which an outer diameter is formed 0.2 to 0.4 mm larger than a center diameter of the second roller may be used.

In the flattening step, the third roller may be made of a silicone material having a hardness of 60 to 80 and may have a smooth shape having the same diameter, and may flatten the adhesive.

In the curing step, the adhesive may be cured by irradiating ultraviolet rays with a wavelength of 200 to 300 nm at an amount of light of 3000 to 4000 mJ/cm$^2$.

Furthermore, the attaching step may further include a preheating step of preheating the coating film before the curing step after the pressing step.

The coating film supply step may further include: a base layer supply step of supplying a base layer made of a PC film or a polymethyl methacrylate (PMMA) film; and a coating layer forming step of forming a coating layer by coating an organic-inorganic hybrid compound on one side of the base layer. The coating film supply step may manufacture and supply the coating film.

Here, in the base layer supply step, the base layer may be formed by stacking a plurality of the PC films, by stacking a plurality of the PMMA films, or by stacking the PC film and the PMMA film.

Also, in the coating layer forming step, the organic-inorganic hybrid compound formed by chemically combining silica (Si) to an epoxy resin may be coated.

Here, in the coating film supply step, the coating film may be supplied such that the base layer faces the base material layer.

Furthermore, the coating film supply step may further include a pattern layer forming step of forming a specific pattern layer on the other side of the base layer.

Here, in the pattern layer forming step, the pattern layer may be formed by one of a silk screen printing method, a gravure printing method, and a digital dot printing method.

Here, in the coating film supply step, the coating film may be provided such that the pattern layer faces the base material layer.

Advantageous Effects

According to the method for manufacturing plastic glazing according to the embodiment of the present invention, provided is a method for forming a high hardness coating layer in a base material layer made of polycarbonate, thereby obtaining an effect of improving scratch resistance, abrasion resistance, chemical resistance, and light resistance.

BRIEF DESCRIPTION OF THE DRAWINGS

FIG. 1 is a cross sectional view showing schematically plastic glazing manufactured by a method for manufacturing plastic glazing in accordance with an embodiment of the present invention;

FIG. 2 schematically shows the method for manufacturing plastic glazing in accordance with the embodiment of the present invention;

FIG. 3 schematically shows a method for forming a coating layer on both sides of a base material layer in the method for manufacturing plastic glazing in accordance with the embodiment of the present invention;

FIG. 4 schematically shows a plurality of rollers used in the attaching in the method for manufacturing plastic glazing in accordance with the embodiment of the present invention;

FIG. 5 is a plan view schematically showing the plurality of rollers used in the attaching in the method for manufacturing plastic glazing in accordance with the embodiment of the present invention;

FIG. 6 schematically shows a path through which an adhesive is moved by the plurality of rollers in the method for manufacturing plastic glazing in accordance with the embodiment of the present invention;

FIG. 7 schematically shows a device which is used in the adhesive supplying in the method for manufacturing plastic glazing in accordance with the embodiment of the present invention;

FIG. 8 schematically shows a method for forming the coating layer in the method for manufacturing plastic glazing in accordance with the embodiment of the present invention;

FIG. 9 schematically shows a method for forming a pattern layer in the method for manufacturing plastic glazing in accordance with the embodiment of the present invention;

FIG. 10 schematically shows a method for continuously supplying and manufacturing a coating film in the method for manufacturing plastic glazing in accordance with the embodiment of the present invention;

FIG. 11 schematically shows a method for manufacturing a molded product by using the plastic glazing according to the embodiment of the present invention;

FIG. 12 is a flowchart schematically showing the method for manufacturing plastic glazing in accordance with the embodiment of the present invention;

FIG. 13 is a flowchart schematically showing the method for manufacturing the coating film in the method for manufacturing plastic glazing in accordance with the embodiment of the present invention; and FIG. 14 is a flowchart schematically showing the method for manufacturing a molded product by using the plastic glazing according to the embodiment of the present invention.

DETAILED DESCRIPTION

For the purpose of assisting the understanding of characteristics of the present invention, a method for manufacturing plastic glazing related to embodiment of the present invention will be described in more detail below.

In assigning reference numerals to components of each drawing accompanied in order to assist the understanding of the following embodiments, the same or similar elements are denoted by the same reference numerals even though they are depicted in different drawings. Further, in the description of the present invention, the detailed description of known functions and configurations incorporated herein is omitted to avoid making the subject matter of the present invention unclear.

Hereinafter, detailed embodiments of the present invention will be described with reference to the accompanying drawings.

FIG. 1 is a cross sectional view showing schematically plastic glazing manufactured by a method for manufacturing plastic glazing in accordance with the embodiment of the present invention. FIGS. 2 and 3 schematically show the method for manufacturing plastic glazing. FIGS. 4 and 6 schematically show a plurality of rollers used in the attaching in the method for manufacturing plastic glazing. FIG. 7 schematically shows a device which is used in the adhesive supplying in the method for manufacturing plastic glazing. FIGS. 8 and 9 schematically show a method for forming the coating layer and a pattern layer in the method for manufacturing plastic glazing. FIG. 10 schematically shows a method for continuously supplying and manufacturing a coating film in the method for manufacturing plastic glazing. FIG. 11 schematically shows a method for manufacturing a molded product by using the plastic glazing.

FIG. 12 is a flowchart schematically showing the method for manufacturing plastic glazing. FIG. 13 is a flowchart schematically showing the method for manufacturing the coating film in the method for manufacturing plastic glazing. FIG. 14 is a flowchart schematically showing the method for manufacturing a molded product by using the plastic glazing.

Referring to FIGS. 1 to 14, the method for manufacturing plastic glazing according to the embodiment of the present invention provides a base material layer supply step S110 of supplying a base material layer 110 made of polycarbonate (hereinafter, referred to as PC) resin, an adhesive supply step S120 of applying an adhesive 130a to at least one side of the base material layer 110, a coating film supply step S130 of seating a coating film 120 on an upper side of the adhesive 130a applied to the base material layer 110, and attaching steps S140 and S150 of pressing the supplied coating film 120 and of attaching to the base material layer 110.

The base layer supply step S110 is for continuously providing a previously formed PC film to the base material layer 110. Needless to say, although not shown in the drawings, the base material layer may be continuously provided through injection molding.

The adhesive supply step S120 is for supplying the adhesive 130a between the base material layer 110 and the coating film 120 in order to adhere the coating film 120 to the base material layer 110.

For example, in the adhesive supply step S120, a certain amount of the adhesive may be supplied through a discharge pump 213 from a storage tank 212 in which the adhesive 130a is stored to a discharge device 211 which applies the adhesive 130a on a surface of the base material layer 110. That is, since the base material layer 110 is continuously provided, a certain amount of the adhesive 130a may be continuously supplied to an upper side of the base material layer 110.

Also, the method may further include an adhesive recovery step of recovering the adhesive to the storage tank 212 through a recovery pump 215 from a recovery tray 214 which stores the adhesive 130a flowing down from the base material layer 110. That is, as shown in FIG. 7, when the adhesive 130a is applied to the base material layer 110 through the discharge device 211, the coating film 120 is seated on the upper side of the applied adhesive 130a, and then is pressed by a first roller 221. Here, the adhesive 130a may flow down to both sides of the base material layer 110. The thus flowing adhesive falls down into and is stored in the recovery tray 214. The adhesive which has fallen down into and been stored in the recovery tray 214 may be discharged to and stored in the storage tank 212 by the recovery pump 215. Accordingly, the adhesive flowing down to both sides of the base material layer 110 by the pressing force after being sufficiently supplied to the base material layer 110 may be recovered and recycled.

The attaching steps S140 and S150 are for attaching the coating film 120 to the base material layer by pressing the coating film 120 supplied on the upper side of the adhesive 130a.

Here, the attaching steps S140 and S150 include a pressing step S140 in which a plurality of rollers 221, 222, and 223 presses the coating film 120 and include a curing step S150 of curing the adhesive 130a by irradiating UV to the coating film 120.

For example, the pressing step S140 may include a first moving step of moving the applied adhesive in a first direction by pressing it with the first roller 221 and of removing contained bubbles; a second moving step of controlling a thickness of the adhesive by moving the adhesive that has been moved in the first direction in a second direction by pressing the adhesive with a second roller; and a flattening step of flattening the adhesive by pressing the adhesive with a third roller.

More specifically, in the first moving step, as shown in FIGS. 4 to 6, the first roller 221 is formed to have a convex shape that increases in diameter toward the center thereof, so that the first roller 221 may move the applied adhesive to the outside of the base material layer 110, that is, in the first direction. Since the adhesive 130a which is discharged from the discharge device 211 may be applied only to the central region of the base material layer 110, the first roller 221 is provided in a convex shape, thereby moving the adhesive applied only to the central region outward, that is, both side ends of the base material layer 110.

Also, when the adhesive is moved outward by the first roller 221, the bubbles contained in the adhesive can be removed, so that non-uniform adhesion due to the bubbles can be prevented.

As such, the first roller 221 may be used by changing a deviation of an outer diameter of the first roller with respect to a center diameter of the first roller in response to a thickness of an adhesive layer.

For example, when the thickness of the adhesive layer 130 is 50 to 100 μm, it is desirable that the outer diameter of the first roller is formed 4 to 10 mm smaller than the center diameter of the first roller. That is, when the thickness of the adhesive layer 130 is formed to be 50 μm, the thickness of the adhesive layer 130 becomes thinner, so that the outer diameter of the first roller 221 may be formed 10 mm smaller than the center diameter of the first roller 221 such that the adhesive distributed in the center can move a lot outward.

Also, in the second moving step, the second roller 222 is provided to have a concave shape that decreases in diameter toward the center thereof, the adhesive which has been moved outward, that is, in the first direction may be moved moving inward, that is, in the second direction, i.e., to the central region of the base material layer 110.

Here, it is desirable that the second roller 222 of which an outer diameter is formed 0.2 to 0.4 mm larger than a center diameter of the second roller is used. That is, the second roller 222 moves a portion of the adhesive distributed to the outside of the base material layer 110 to the central region of the base material layer 110, so that the adhesive can be distributed uniformly to some extent over the entire area of the base material layer 110. Accordingly, the second roller 222 is formed lest a large deviation between the outer diameter and the center diameter should occur.

The flattening step is a step in which the adhesive uniformly distributed to some extent by the second roller 222 is flattened by being pressed by the third roller 223 which has a smooth shape having the same diameter.

Here, the third roller 223 functions to flatten the adhesive while pressing the coating film 120 by a constant force. Therefore, the third roller 223 is made of a silicone material in order to have an elastic force, and may have a hardness of 60 to 80 such that the pressing force can be applied.

In this way, as shown in FIG. 6, as the adhesive moves in the form of a wave pattern so that the bubbles are removed, a moving path L of the adhesive may be entirely uniformly distributed. That is, the bubbles contained in the adhesive can be removed by moving the adhesive outward by the first roller 221, and the adhesive is uniformly distributed to some degree while moving the adhesive back to the center by the second roller 222. Then, the adhesive may be uniformly distributed by being flattened by the third roller 223.

Also, a first sweeping phenomenon of the adhesive occurs while the adhesive is moved outward by the first roller 221 and the second roller 222 and a second sweeping phenomenon of the adhesive occurs while the adhesive is moved inward again. As a result, the adhesive strength of the adhesive can be improved by such an adhesive sweeping phenomenon.

Moreover, the first roller 221 may be provided as a heat roller which is heated to a temperature of 80 to 100° C.

That is, when the adhesive 130a is provided in a solvent type and at least one of methyl ethyl ketone, methyl isobutyl ketone, ethyl acetate, and butyl acetate is used as a solvent, the solvent is volatilized through the first roller 221 provided as a heat roller, so that the adhesive 130a is rapidly cured in the subsequent curing step. Needless to say, the adhesive 130a may be provided in a solventless type.

Further, not only the first roller 221 but also the second roller 222 and the third roller 223 may be provided as a heat roller and be heated.

The curing step S150 is for forming the adhesive layer by curing the adhesive through a curing device 240 which irradiates UV to the coating film 120, in the state where the adhesive is applied between the base material layer 110 and the coating film 120.

Here, the curing step S150 may be performed to cure the adhesive by irradiating ultraviolet rays with a wavelength of 200 to 300 nm at an amount of light of 3000 to 4000 mJ/cm$^2$. Surely, a condition for curing the adhesive is not limited thereto, and the curing condition of the adhesive may be changed in response to the thickness and process environmental conditions of the adhesive layer and the coating film 120.

Moreover, the attaching steps S140 and S150 may further include a preheating step of preheating the coating film 120 before the curing step S150 after the pressing step S140. In the preheating step, the coating film 120 may be preheated such that the surface temperature of the coating film 120 is 70 to 80° C. through a heating device 230. Through this, the adhesive can be cured more quickly in the curing step S150. That is, when the adhesive 130a is provided in a solvent type and at least one of methyl ethyl ketone, methyl isobutyl ketone, ethyl acetate, and butyl acetate is used as a solvent, the solvent is volatilized through the preheating step so that the adhesive 130a is rapidly cured in the subsequent curing step S150. Of course, the adhesive 130a may be provided in a solventless type.

The coating film supply step S130 is for supplying the coating film 120 on at least one side of the base material layer 110. The coating film may be, as shown in FIG. 2, provided to one side of the base material layer 110 through coating film supply rollers 321 and 322 on which the previously manufactured coating film 120 has been wound, or the coating film 120 may be, as shown in FIG. 3, provided on both sides of the base material layer 110, or the coating film 120 may be, as shown in FIG. 10, continuously provided while manufacturing the coating film 120.

More specifically, the coating film supply step S130 may include a base layer supply step S131 of supplying a base layer 121 made of a PC film or a polymethyl methacrylate (PMMA) film, and a coating layer forming step S132 of forming a coating layer 122 by coating an organic-inorganic hybrid compound on one side of the base layer 121.

In the base layer supply step S131, the base layer 121 may be supplied through a base layer supply roller 310 on which the previously manufactured base layer 121 has been wound. Here, the base layer 121 may be formed of a single PC film or a PMMA film, or may be formed by stacking a plurality of the PC films or a plurality of the PMMA films, or may be formed by stacking the PC film and the PMMA film.

In the coating layer forming step S132, as shown in FIG. 8, a coating solution that is an organic-inorganic hybrid compound is applied by using a gravure printing device 331 to one side of the base layer 121 which is continuously supplied through the base layer supply roller 310, and then the coating solution is cured while passing through a curing device 350, so that the coating layer 122 is manufactured. Also, the film in which the coating layer 122 is formed on the base layer 121 is wound around a coating film supply roller 321.

Also, the organic-inorganic hybrid compound may be formed by chemically combining silica (Si) to an epoxy resin. Here, when the content of silica increases, the hardness increases and the flexibility decreases, and when the content of the epoxy resin increases, the flexibility increases and the hardness decreases. Therefore, the content of the epoxy resin and the content of silica can be adjusted according to the purpose of application.

Here, the organic-inorganic hybrid compound may be formed by chemically combining the epoxy resin and the silica rather than simply mixing them.

A mixture of the epoxy resin and silica has the advantage of being easy to make. However, the mixture has disadvantages such as poor transmittance, low surface hardness, poor light resistance, poor weather resistance, and poor chemical resistance.

Compared with this, when the epoxy resin and the silica are chemically combined, it is difficult to manufacture. However, the transmittance of 89% or more and excellent hardness and flexibility can be obtained, and excellent light resistance, weather resistance and chemical resistance can be obtained. Additionally, diffuse reflection and refraction do not occur.

Accordingly, in the plastic glazing according to the embodiment of the present invention, the coating solution obtained by chemically combining the epoxy resin and the silica is formed as a coating layer.

Also, the coating film supply step S130 may further include a pattern layer forming step S133 of forming a specific pattern layer 123 on the other side of the base layer 121.

For example, in the pattern layer forming step S133, a pattern may be, as shown in (a) of FIG. 9, formed by using a gravure printing device 332. That is, the coating film 120 is continuously supplied through the coating film supply roller 321 on which the coating layer 122 is formed and wound on one side of the base layer 121, and ink is applied to the other side of the base layer 121 of the supplied coating film 120 via the gravure printing device 332. Then, the ink is cured while passing through the curing device 350 so that the pattern layer 123 is formed and wound on another coating film supply roller 322.

Alternatively, in the pattern layer forming step S133, a pattern may be, as shown in (b) of FIG. 9, formed by using a silk screen printing device or a digital dot printing (DDP) device 340. That is, the base layer 121 is supplied through the coated film supply roller 321 on which the coating layer 122 is formed on one side of the base layer 121 and wound, and ink is applied to the other side of the base layer 121 of the supplied coating film 120 via the silk screen printing device or the DDP device 340. Then, the ink is cured while passing through the curing device 350 so that the pattern layer 123 is formed and wound on another coating film supply roller 322.

Here, UV curing ink or resin may be provided as the ink. That is, when using general ink instead of UV curing ink, color bleeding may occur.

Further, in the coating film supply step S130, after the pattern layer 123 is formed and wound on the coating film supply roller 322, the coating film is, as shown in FIG. 2, supplied to the base material layer 110. Alternatively, without being wound separately on the coating film supply roller, the coating layer 122 is, as shown in FIG. 10, formed on one side of the continuously supplied base material layer 110 and is cured, and then the coating film 120 may be continuously supplied to the base material layer 110 such that the pattern layer 123 is seated on the base material layer 110.

Also, in the coating film supply step S130, the coating film 120 is supplied such that the pattern layer 123 faces the base material layer 110. That is, the pattern layer 123 is seated on the base material layer 110 and the coating layer 122 is stacked to be disposed on the outermost position.

The curing device 350 may be configured, for example, as a device for curing resin by irradiating ultraviolet rays (UV).

The plastic glazing 100 manufactured by the method for manufacturing the plastic glazing in accordance with the embodiment of the present invention may be manufactured in four forms as an example.

More specifically, as shown in (a) of FIG. 1, a coating film composed of the base layer 121 on which the PC film and the PMMA film are stacked and of the coating layer 122 stacked on the base layer 121 is stacked on the base material layer 110 by the adhesive layer 130, so that the plastic glazing 100 may be manufactured. Here, the base layer 121 of the coating film is attached to the adhesive layer 130 and the coating layer 122 is stacked to be disposed outside. Although not shown in the drawings, the coating film may be stacked on both sides of the base material layer 110.

Also, as shown in (b) of FIG. 1, the base layer 121 on which the PC film and the PMMA film are stacked and the coating film formed by stacking the coating layer 122 on one side of the base layer 121 and by stacking the pattern layer 123 on the other side are stacked on the base material layer 110 by the adhesive layer 130, so that the plastic glazing 100 may be manufactured. Here, the pattern layer 123 of the coating film 120 is attached to the adhesive layer 130 and the coating layer 122 is stacked to be disposed outside. Here, as shown in (d) of FIG. 1, the coating film 120 may be stacked on both sides of the base material layer 110.

Also, as shown in (c) of FIG. 1, the coating film on which the pattern layer 123 is formed is stacked on one side of the base material layer 110 by the adhesive layer 130, and the coating film on which the pattern layer is not formed is stacked on the other side of the base material layer 110 by the adhesive layer 130, so that the plastic glazing 100 may be manufactured.

A method for manufacturing a molded product by using the plastic glazing manufactured by the above method includes a sheet cutting step S210 of cutting the plastic glazing 100 manufactured by a continuous process to a specific size, a sheet preheating step S220 of preheating the cut plastic glazing sheet S with a heating device 410, and a molding step S230 of molding by pressing the preheated plastic glazing sheet S in a mold 420.

In the sheet preheating step S220, when the plastic glazing sheet S is pressed in the mold 420, the surface temperature of the plastic glazing sheet S is maintained at a temperature of 200 to 250° C. such that shape deformation can be easily performed without cracking.

Further, in the molding step S230, in order to prevent the plastic glazing sheet S from being cooled by the mold 420 while the mold 420 presses the plastic glazing sheet S, the plastic glazing sheet S may be molded by being pressed for 45 to 60 seconds in a state where the mold 420 is heated such that the temperature of the mold 420 is maintained at a temperature of 60 to 100° C.

Also, the method for manufacturing a molded product by using the plastic glazing according to the embodiment of the present invention may further include a pattern forming step.

In the pattern forming step S240, the molded plastic glazing sheet S is vacuum adsorbed onto a lower mold 432 and then an upper mold 431 is pressed to form a specific pattern. Needless to say, even without the separate pattern forming step S240, a specific pattern is formed on the mold 420 used in the molding step S230, so that the specific pattern may be formed together while forming the plastic glazing sheet S.

As above, although the present invention has been described by the limited embodiments and drawings, the present invention is not limited to the embodiments and drawings and may be variously changed and modified without departing from the spirit of the present invention, the appended claims and equivalents thereto by those skilled in the art.

| REFERENCE NUMERALS | |
| --- | --- |
| 100: plastic glazing | 110: base material layer |
| 120: coating film | 121: base layer |
| 122: coating layer | 123: pattern layer |
| 211: discharge device | 212: storage tank |
| 213: discharge pump | 214: recovery tray |
| 215: recovery pump | 221: first roller |
| 222: second roller | 223: third roller |
| 230: heating device | 240: curing device |
| 310: base layer supply roller | 321, 322: coating film supply roller |
| 410: heating device | 420: mold |
| 431: upper mold | 432: lower mold |

What is claimed is:

1. A method for manufacturing plastic glazing, the method comprising:
   a base material layer supply step of supplying a base material layer made of polycarbonate (PC) resin;
   an adhesive supply step of applying an adhesive to at least one side of the base material layer;
   a coating film supply step of seating a coating film on an upper side of the adhesive applied to the base material layer; and
   an attaching step of pressing the supplied coating film and attaching the pressurized coating film to the base material layer,
   wherein a the attaching step comprises:
   a pressing step of pressing the coating film by a plurality of rollers; and
   a curing step of curing the adhesive by irradiating UV light to the coating film, and
   wherein the pressing step comprises:
   a first moving step of moving the applied adhesive in a first direction by pressing the coating film with a first roller and of removing contained bubbles;
   a second moving step of controlling a thickness of the adhesive by moving the adhesive that has been moved in the first direction in a second direction by pressing the coating film with a second roller; and
   a flattening step of flattening the adhesive by pressing the coating film with a third roller.

2. The method for manufacturing plastic glazing of claim 1, wherein, in the adhesive supply step, a certain amount of the adhesive is supplied through a discharge pump from a storage tank in which the adhesive is stored to a discharge device which applies the adhesive on a surface of the base material layer.

3. The method for manufacturing plastic glazing of claim 2, further comprising an adhesive recovery step of recovering the adhesive to the storage tank through a recovery pump from a recovery tray which stores the adhesive flowing down from the base material layer.

4. The method for manufacturing plastic glazing of claim 1, wherein, in the first moving step, the first roller is provided to have a convex shape that increases in diameter toward a center thereof, and moves the applied adhesive outward.

5. The method for manufacturing plastic glazing of claim 4, wherein, in the first moving step, the first roller is used by changing a deviation of an outer diameter of the first roller with respect to the center diameter of the first roller in response to a thickness of an adhesive layer.

6. The method for manufacturing plastic glazing of claim 5, wherein, in the first moving step, when the thickness of the adhesive layer is 50 to 100 μm, the outer diameter of the first roller is formed 4 to 10 mm smaller than the center diameter of the first roller.

7. The method for manufacturing plastic glazing of claim 1, wherein, in the second moving step, the second roller is provided to have a concave shape that decreases in diameter toward a center thereof, and moves inward the adhesive that has been moved outward.

8. The method for manufacturing plastic glazing of claim 7, wherein, in the second moving step, an outer diameter of the second roller is formed 0.2 to 0.4 mm larger than the center diameter of the second roller is used.

9. The method for manufacturing plastic glazing of claim 1, wherein, in the flattening step, the third roller is made of a silicone material having a shore hardness of 60 to 80 and has a smooth shape having the constant diameter, and flattens the adhesive.

10. The method for manufacturing plastic glazing of claim 1, wherein, in the curing step, the adhesive is preliminarily cured by applying heat of 70 to 80° C. to the adhesive through a preliminary curing device.

11. The method for manufacturing plastic glazing of claim 1, wherein the attaching step further comprises a preheating step of preheating the coating film before the curing step after the pressing step.

12. The method for manufacturing plastic glazing of claim 1,
wherein the coating film supply step further comprises:
a base layer supply step of supplying a base layer made of a PC film or a polymethyl methacrylate (PMMA) film; and
a coating layer forming step of forming a coating layer by coating an organic-inorganic hybrid compound on one side of the base layer.

13. The method for manufacturing plastic glazing of claim 12, wherein, in the base layer supply step, the base layer is formed by stacking a plurality of the PC films, by stacking a plurality of the PMMA films, or by stacking the PC film and the PMMA film.

14. The method for manufacturing plastic glazing of claim 12, wherein, in the coating layer forming step, the organic-inorganic hybrid compound formed by chemically combining silica (Si) to an epoxy resin is coated onto the base layer.

15. The method for manufacturing plastic glazing of claim 12, wherein, in the coating film supply step, the coating film is supplied such that the base layer faces the base material layer.

16. The method for manufacturing plastic glazing of claim 12, wherein the coating film supply step further comprises a pattern layer forming step of forming a specific pattern layer on an other side of the base layer.

17. The method for manufacturing plastic glazing of claim 16, wherein, in the pattern layer forming step, the pattern layer is formed by one of a silk screen printing method, a gravure printing method, and a digital dot printing method.

18. The method for manufacturing plastic glazing of claim 16, wherein, in the coating film supply step, the coating film is provided such that the pattern layer faces the base material layer.

\* \* \* \* \*